United States Patent

Idomoto et al.

Patent Number: 6,114,677
Date of Patent: Sep. 5, 2000

[54] MICROWAVE HEATING APPARATUS HAVING A METAL PLATE ROTATABLY DISPOSED IN A WAVE GUIDE

[75] Inventors: Susumu Idomoto, Yamatokoriyama; Kazuho Sakamoto, Souraku-gun; Hirofumi Yoshimura, Nara, all of Japan

[73] Assignee: Matsushita Electric Industrial Co., Ltd., Kadoma, Japan

[21] Appl. No.: 09/194,739

[22] PCT Filed: May 29, 1997

[86] PCT No.: PCT/JP97/01822

§ 371 Date: Dec. 2, 1998

§ 102(e) Date: Dec. 2, 1998

[87] PCT Pub. No.: WO97/47161

PCT Pub. Date: Dec. 11, 1997

[30] Foreign Application Priority Data

Jun. 3, 1996 [JP] Japan .................................. 8-139884
Jan. 28, 1997 [JP] Japan .................................. 9-013630

[51] Int. Cl.[7] .................................................. H05B 6/74
[52] U.S. Cl. .......................... 219/709; 219/696; 219/745; 219/750; 219/751
[58] Field of Search ...................... 219/745, 746, 219/748, 749, 750, 751, 756, 754, 695, 696, 708, 709

[56] References Cited

U.S. PATENT DOCUMENTS

| | | | |
|---|---|---|---|
| 4,185,182 | 1/1980 | Rueggeberg | 219/751 |
| 4,808,784 | 2/1989 | Ko | 219/746 |
| 5,512,736 | 4/1996 | Kang et al. | 219/750 |

FOREIGN PATENT DOCUMENTS

| | | | |
|---|---|---|---|
| 0 277 342 | 8/1988 | European Pat. Off. | |
| 0 552 807 | 7/1993 | European Pat. Off. | |
| 0 585 143 | 3/1994 | European Pat. Off. | |
| 52-72953 | 6/1977 | Japan | 219/745 |
| 63-254321 | 10/1988 | Japan | 219/745 |
| 63-294685 | 12/1988 | Japan | 219/745 |

*Primary Examiner*—Philip H. Leung
*Attorney, Agent, or Firm*—Wenderoth, Lind & Ponack, L.L.P.

[57] ABSTRACT

A microwave heating apparatus includes a magnetron (6) mounted on a top surface of a wave guide (7). A bottom surface of wave guide (7) is inclined towards the bottom of the wave guide opening. A metal plate (9) is provided with a predetermined clearance above the bottom surface of wave guide (7). The microwaves are irradiated from an antenna (10) of magnetron (6) and travel along the bottom surface of wave guide (7). The microwaves are guided to an opening (8) under regulation by a metal plate (9) dispersion, and thus the microwaves reach the opening without suffering from the loss of energy. An object of heating (1) is irradiated directly by the microwaves with an improved heating efficiency.

20 Claims, 11 Drawing Sheets

MICROWAVE HEATING APPARATUS HAVING A METAL PLATE ROTATABLY DISPOSED IN A WAVE GUIDE

BACKGROUND OF THE INVENTION

1. Technical Field

The present invention relates to a microwave heating apparatus for heating foodstuff, specifically a contraction for heating foodstuffs efficiently and evenly.

2. Description of Related Art

Figure 9:
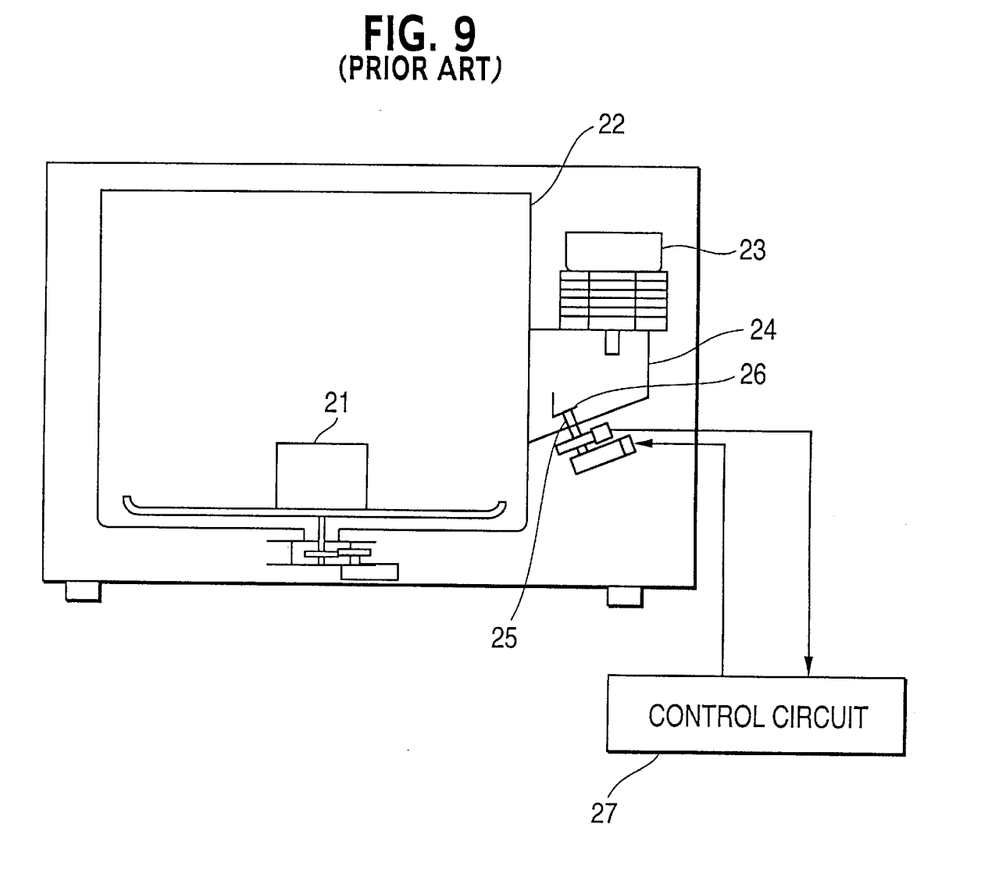
FIG. 9 is a cross-sectional front view of a prior art microwave heating apparatus.
Figure 10:
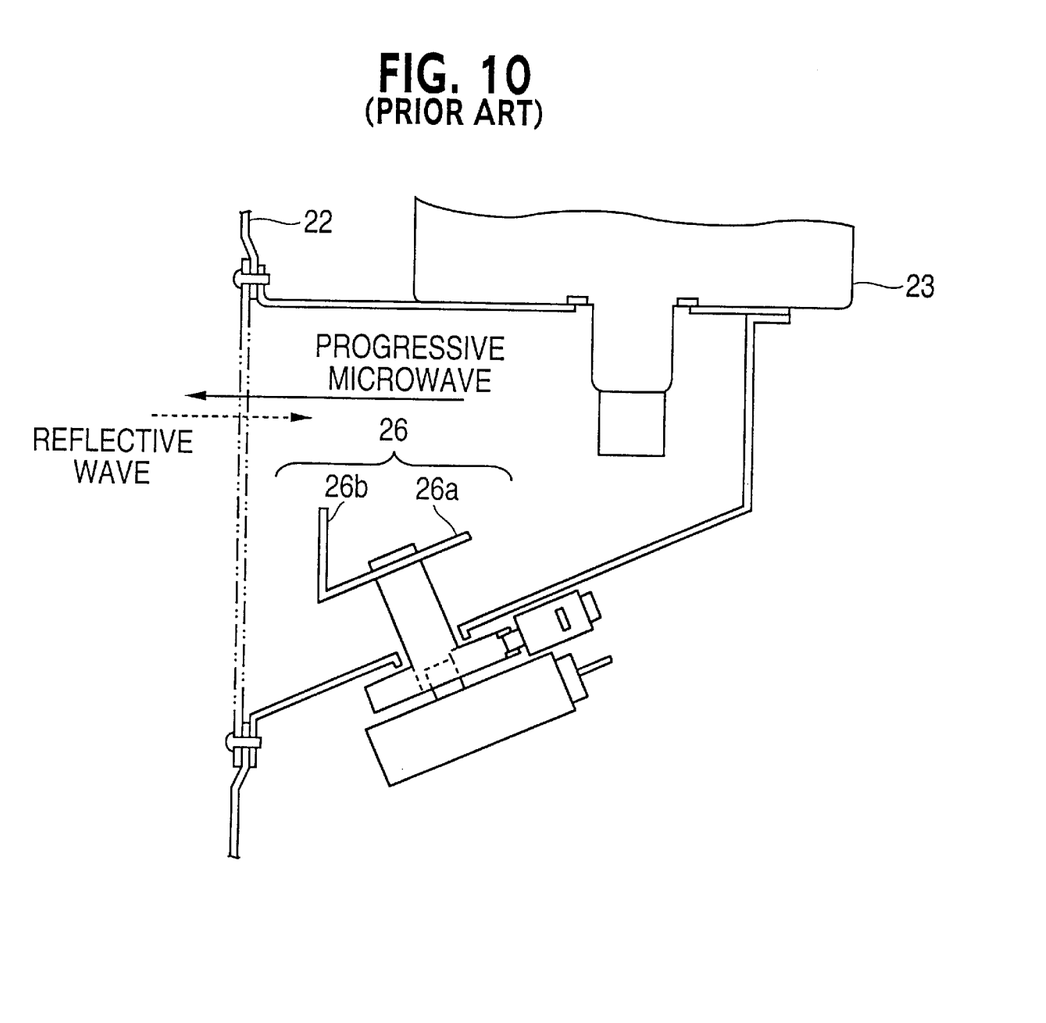
FIG. 10 is a cross-sectional view showing a key part of the microwave heating apparatus of FIG. 9.
Figure 11:
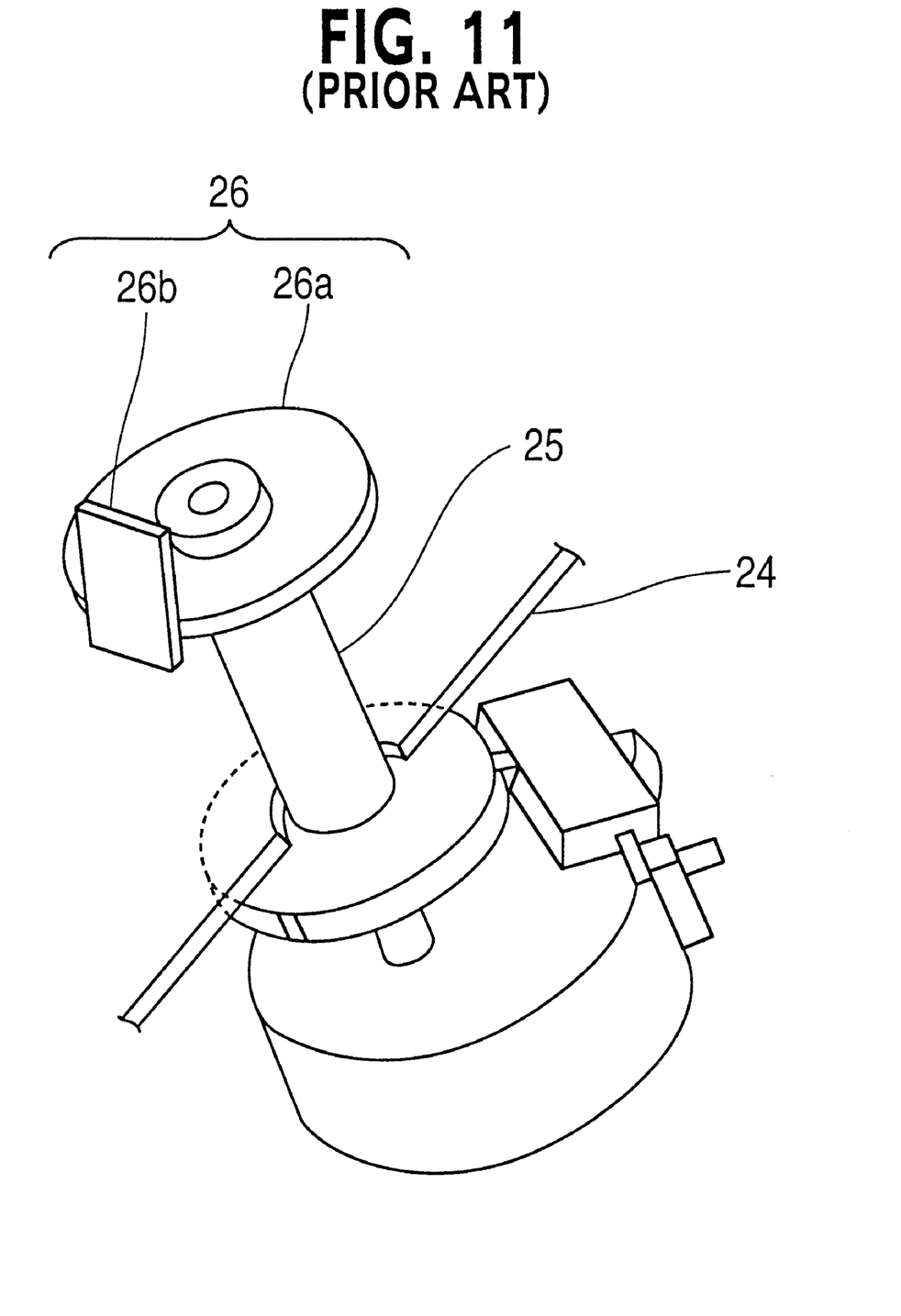
FIG. 11 is a perspective view showing the key part of the microwave heating apparatus of FIG. 9.

There have been a number of proposals for apparatuses to heat an object in a heating cavity evenly, or efficiently. The following is a description of Japanese Laid-open Patent No. 8-17569, which discloses an apparatus having a construction that is similar to that of the present invention. As shown in FIG. 9, FIG. 10 and FIG. 11, a prior art microwave heating apparatus comprises a heating cavity 22 for heating/cooking a heating object 21, a magnetron 23 for irradiating microwaves into the heating cavity 22, a wave guide 24 for coupling the heating cavity 22 and the magnetron 23, a dielectric axle 25 being inserted in the wave guide 24, a metal reflector 26 held by the dielectric axle 25 for adjusting the impedance comprised of a reflecting surface 26a and a metal stub 26b provided at the circumference of the reflecting surface, and a control means 27 for controlling the positioning of metal stub 26b by revolution of the metal reflector 26. A means for discerning, by way of detecting the temperature of heating object 21, a transition point at which physical properties of a heating object 21 change during microwave heating procedure is provided. Also, the impedance matching of microwaves within heating cavity 22 is varied by revolving the metal reflector 26 before and after the transition point in order to create a heating condition that is optimal for each of various stages of the physical properties of the heating object 21. The apparatus is further provided with a construction that allows it to thaw a frozen heating object 21 by even heating in a state under which the microwaves hardly hit directly on the heating object. Such a state is created by revolving the metal reflector 26, while supplying electric power without interruption to a microwave generating means in order to maintain the operation at a weak output level.

It is true that in the above described prior art microwave heating apparatus, where the impedance is adjusted for a heating object 21, the heating efficiency is improved as compared with a microwave heating apparatus, having a heating cavity 22 of the same shape and the same power supply system with no means for adjusting the impedance. However, with the impedance adjustment means the greatest output of magnetron 23 is being delivered to heating cavity 22, and not all of the output is absorbed into heating object 21. Further, a certain impedance adjusted relative to a heating object 21 is not always one which results in even heating. Therefore, in some instances efficient but uneven heating may occur depending on the category of heating object 21.

SUMMARY OF THE INVENTION

In order to solve the above described problem, a microwave heating apparatus according to the present invention comprises a magnetron for irradiating microwaves, a wave guide for guiding the microwaves generated by the magnetron to a heating cavity, an opening for delivering the microwaves that have traveled through the wave guide into the heating cavity sideways, and a metal plate provided inside the wave guide for regulating the direction of microwaves. The magnetron is disposed on top of the wave guide, while the bottom surface of the wave guide is inclined towards the bottom part of the opening and the metal plate is disposed with a clearance from the bottom surface of the wave guide and in parallel with the bottom surface of the wave guide.

According to the present invention, most of the microwaves irradiated from the magnetron are conveyed to the opening through a gap formed by the wave guide and the metal plate. As the microwaves are conveyed to the opening with a suppressed dispersion, they irradiate a heating object efficiently. The heating efficiency is thus improved.

The metal plate disposed in the wave guide is removably supported by an axle and is provided with a revolving means for shifting the direction of plate, so that the angle of the metal plate in the wave guide relative to the bottom surface of the wave guide is changed in accordance with detection results delivered from a sensor for detecting weight, shape, category, etc. of a heating object or by selection from a cooking menu.

With the above described construction, the quantity of microwave irradiation from the bottom portion of the opening of the wave guide beneath the metal plate and that from the portion of opening closer to the magnetron may be shifted, which makes it possible to evenly heat various heating objects.

A driving means for driving the metal plate, disposed within the wave guide, can revolve or rotate the metal plate so as to create a first state under which the metal plate within the wave guide is in parallel with the bottom surface of the wave guide to a second state under which the metal plate is perpendicular to the bottom of heating cavity, based on detection results delivered from a sensor for detecting weight, shape, category, etc. of a heating object or by selection from a cooking menu.

As a result of the above described construction, two types of heating patterns can be implemented. A first pattern of concentrated microwave irradiation from the opening which pattern is created by positioning the metal plate in parallel with the bottom surface of wave guide, and a second pattern of split microwave irradiation from openings that are split by the metal plate when positioned perpendicular to the bottom of the heating cavity. This enables a user to select a suitable heating pattern according to detection results delivered from the heating object sensor and by selection from a cooking menu key. Thus, the unevenness of temperature in a heating object is reduced.

Furthermore, a driving means for driving the metal plate in the wave guide enables the metal plate to be positioned at any angle relative to the bottom surface of wave guide according to detection results delivered from a sensor for detecting the weight, shape, category, etc. of the heating object or by selection from a cooking menu key.

With the above described construction, a quantitative distribution ratio of microwave irradiation from the opening is controllable to any ratio by shifting the angle of the metal plate. That is, from a concentrated irradiation pattern which is produced by positioning the metal plate in parallel with the bottom surface of the wave guide, to a split irradiation pattern which is produced by positioning the metal plate perpendicular to the bottom of the heating cavity. This enables a heating object to be heated in a more suitable manner according to detection results from the heating object sensor and by selection of a cooking menu key. Thus the unevenness of temperature in a heating object is further reduced.

Further, on a wall surface of the heating cavity other than that having the opening, a stirrer is provided for stirring the microwaves.

This arrangement helps improve the uneven heating during thawing of a frozen heating object, by stirring the microwaves left unabsorbed by a heating object.

Furthermore, on at least one inner wall surface of the heating cavity other than that having the opening, a conical shape is formed so as to protrude outward. The conical shape, at the center thereof, has a spherical shape that protrudes inward.

This arrangement helps improve the uneven heating and the heating efficiency by collecting the microwaves left unabsorbed by a heating object at the center of the conical shape and then reflecting them with the spherical shape to evenly irradiate the heating object.

DETAILED DESCRIPTION OF THE INVENTION

In the following, examplary embodiments of the present invention are described with reference to drawings.

Figure 1:
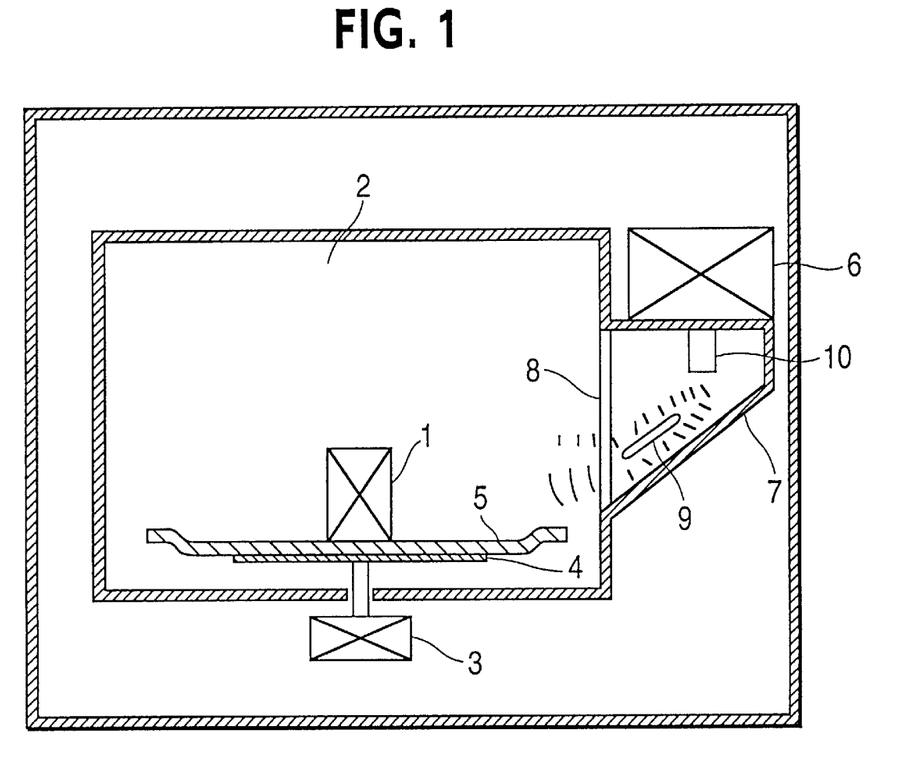
FIG. 1 is a cross-sectional front view of a microwave heating apparatus according to an embodiment of the present invention.

FIG. 1 is a cross-sectional front view of a microwave heating apparatus according to a first embodiment of the present invention.

In FIG. 1, numeral 1 denotes an object of heating such as a foodstuff, and numeral 2 denotes a heating cavity for housing heating object 1. Heating object 1 is placed on a tray 5 which is supported on a metal turntable 4 driven by a motor provided within a weight sensor 3 disposed outside the heating cavity 2 at the bottom center. Numeral 6 denotes a magnetron which generates microwaves for heating the heating object 1, numeral 7 is a wave guide for guiding the microwaves to heating cavity 2, numeral 8 is an opening for taking the microwaves into heating cavity 2, and numeral 9 is a metal plate having a flat shape.

The magnetron 6 is mounted on the top of wave guide 7 with an antenna 10 for irradiating microwaves facing the bottom surface of wave guide 7. The bottom surface of wave guide 7 is disposed aslant towards the bottom of the opening 8, and the metal plate 9 is disposed in parallel with the slanted bottom surface of wave guide 7. The metal plate 9 is made of an aluminum material having a low electric-resistivity in order to obtain a reduced heat generating loss due to microwaves. The metal plate 9 is formed in a rectangular shape in order to match the rectangular cross-sectional shape of the wave guide 7 (FIG. 2) and to thereby obtain the highest possible effects in regulating the direction of the microwaves.

Because the portion of the width of wave guide 7 that is blocked by metal plate 9 is only approximately 10 mm, the opening 8 is divided into a lower opening, formed by the bottom surface of wave guide 7 and metal plate 9, and an upper opening formed by the ceiling surface of wave guide 7 and metal plate 9.

Now the operation and the function of the microwave heating apparatus will be described. Microwaves irradiated vertically from antenna 10 of magnetron 6 with a certain spread angle reach the bottom surface of wave guide 7 and travel along the down slope. Because of the metal plate 9, which is disposed in parallel with the bottom surface of wave guide, most of the microwaves arrive at opening 8 without being dispersed, and then start spreading beyond the opening 8. As a result, the distance before arriving at heating object 1 is shorter and the percentage of microwaves directly reaching heating object 1 becomes higher.

By arranging the inclination of the bottom surface of wave guide 7 so that an extension line crosses the tray 5 at approximately the center, the microwave irradiation may be directed towards the bottom center of heating object 1.

A second embodiment is described below with reference to FIGS. 2 through 4(a)–4(c). The basic structure of the second embodiment remains the same as that of the first embodiment. Those elements represented with the same symbols as in the first embodiment have the same structure, and description thereof is omitted here.

Figure 2:
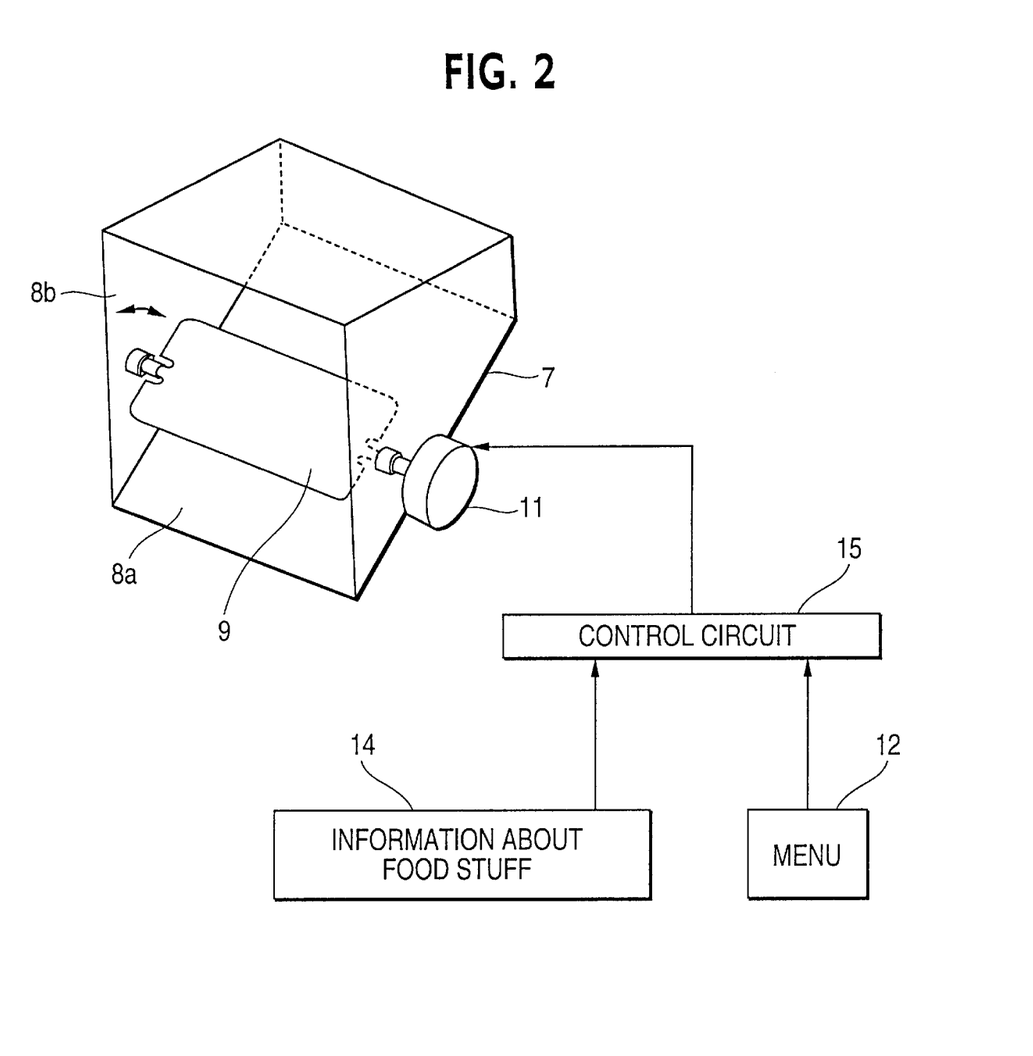
FIG. 2 is a perspective view showing a key part of a microwave heating apparatus according to another embodiment of the present invention.
Figure 3:
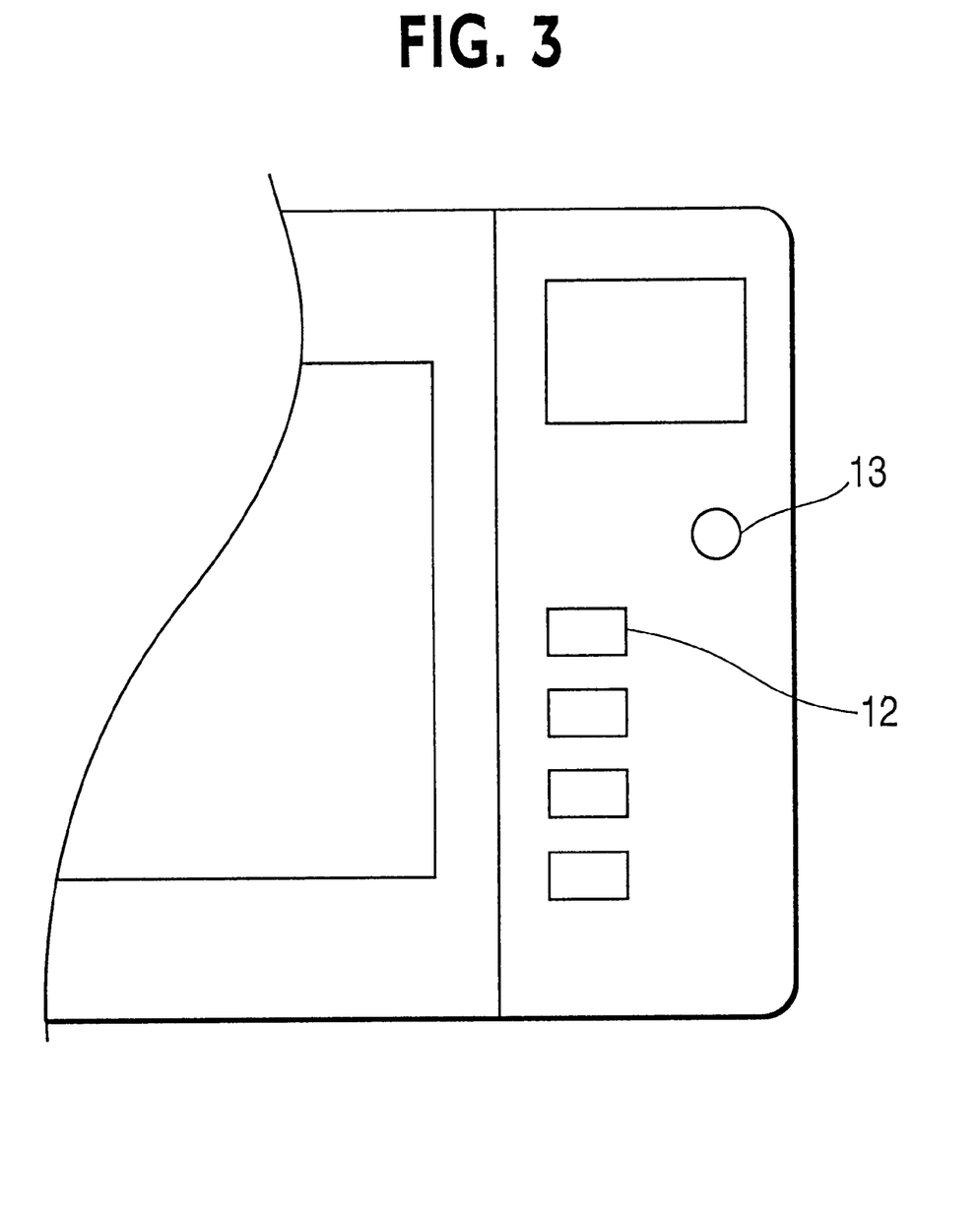
FIG. 3 is a front view of a key portion of the microwave heating apparatus of FIG. 2.

The point of difference as compared with the first embodiment is that the present embodiment comprises a motor 11 for revolving the metal plate 9 that is disposed within wave guide 7. The metal plate 9 may be switched to either a state in which it is positioned in parallel with the bottom surface of wave guide 7 or to a state in which it is positioned perpendicular to the bottom of heating cavity 2, in accordance with detection results (information about foodstuff) 14 obtained from weight sensor 3 for detecting the weight of heating object 1 or by the selection of a cooking menu key(hereinafter simply referred to as menu) 12.

Figure 4A:
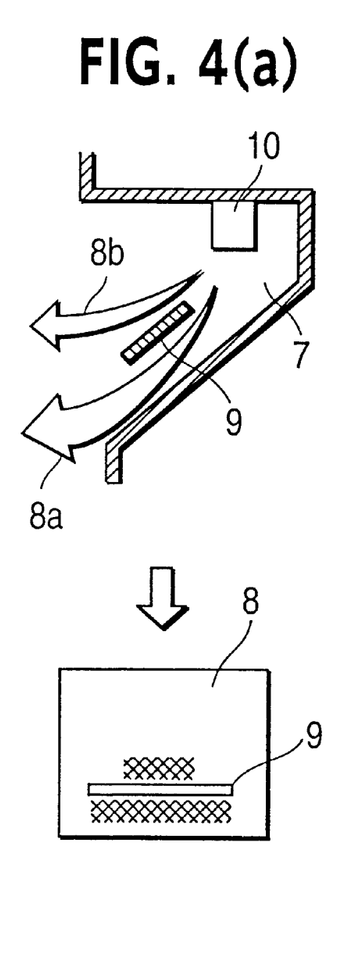
FIGS. 4(a)–4(c) are conceptual illustrations showing the distribution pattern of electric fields in the microwave heating apparatus of FIG. 2.
Figure 4B:
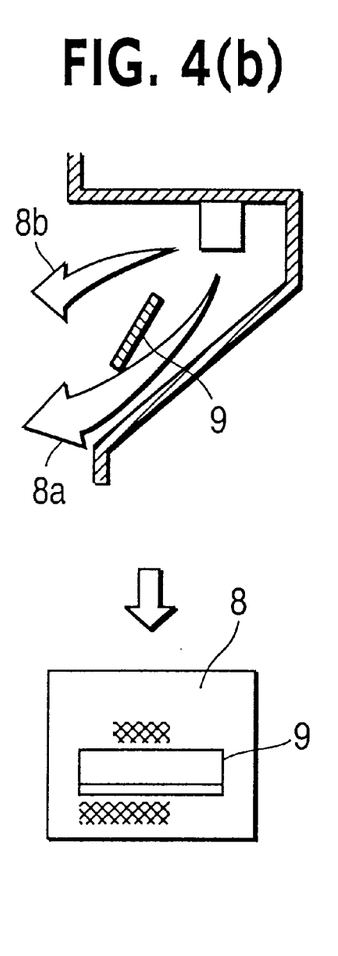
Figure 4C:
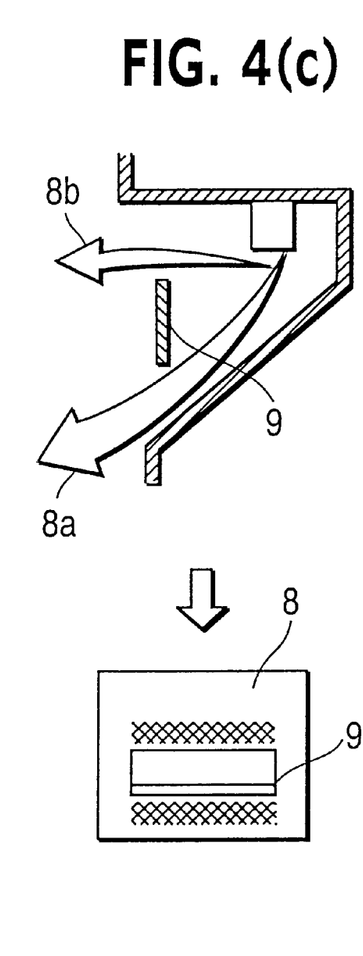

The operation and the function are described in the following. First, a menu key 12 suitable to a particular foodstuff, or heating object 1, is selected, and then a cooking start key 13 is pressed. Magnetron 6 starts irradiating microwaves. Metal turntable 4 as well as tray 5 are revolved by the motor of weight sensor 3, and heating object 1 revolves and the weight is measured. Based on the category of heating object 1 specified by selection of a menu key 12 and the large or small quantity value and other information about foodstuff 14 obtained by weight sensor 3, the metal plate 9 disposed within wave guide 7 for regulating the direction of microwave irradiation is revolved by motor 11. Numeral 15 denotes a control circuit for controlling the motor 11 in accordance with the cooking information. In FIGS. 4(a) through 4(c) illustrate cross-sectional views of the wave guide as well as conceptual distribution patterns of electric fields at the opening 8, as viewed from heating cavity 2, corresponding to respective positioning angles of metal plate 9. FIG. 4(a) shows a distribution pattern when metal plate 9 is positioned in parallel with the inclined bottom surface of wave guide 7, whereas FIG. 4(c) shows distribution pattern when metal plate 9 is perpendicular to the bottom of heating cavity 2; and FIG. 4(b) represents a state in between the states shown in FIG. 4(a) and 4(c). In the state of FIG. 4(a), most of the microwaves irradiate directly on heating object 1 through an opening 8a formed by the bottom surface of wave guide 7 and metal plate 9. While in the state of FIG. 4(c) the microwaves are split into those from an opening 8a formed by the bottom surface of wave guide 7 and metal plate 9 and those from an opening 8b formed by the ceiling surface of wave guide 7 and metal plate 9. Heating object 1 absorbs the microwaves reaching directly from the opening 8a and reflective waves reaching via opening 8b.

Figure 5A:
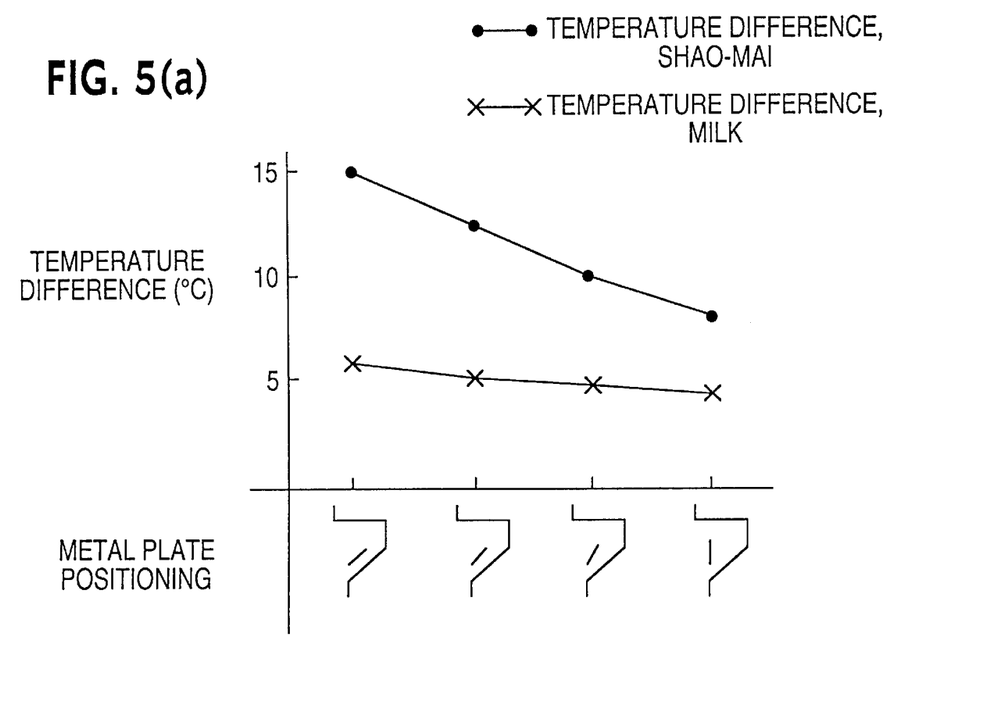
FIG. 5(a) is a characteristics chart showing the temperature difference in objects of heating in relation to the positioning of a metal plate in the microwave heating apparatus.
Figure 5B:
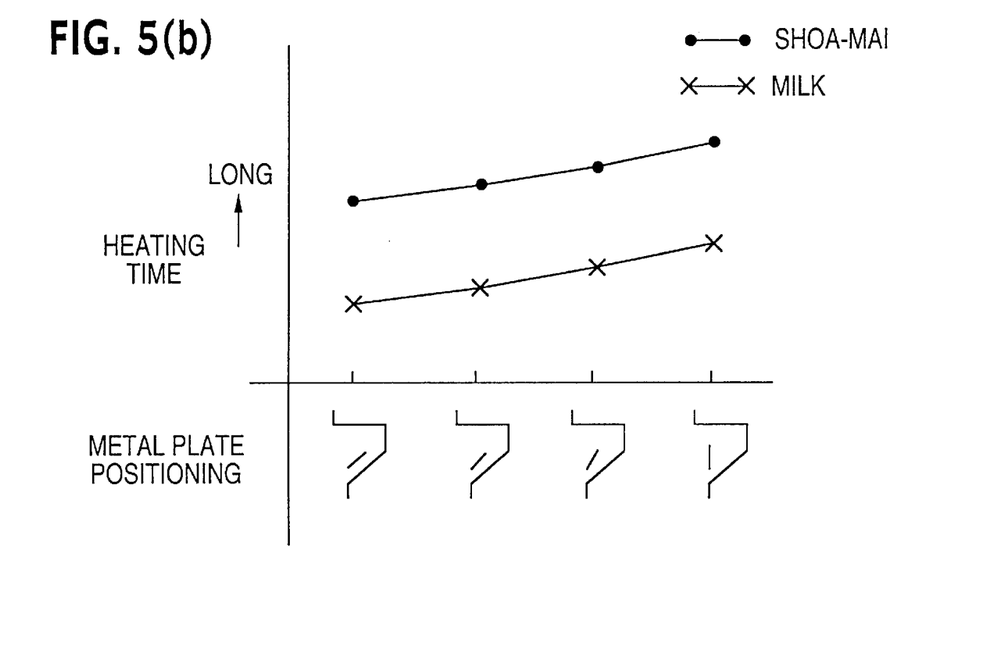
FIG. 5(b) is a characteristics chart showing the heating time for objects of heating in relation to the positioning of the metal plate in the microwave heating apparatus.

FIGS. 5(a) and 5(b) show the result of cooking a cup of milk and a frozen shao-mai. FIG. 5(a) represents a relationship between the positioning of metal plate 9 and the temperature difference in the heating objects, and FIG. 5(b) represents a relationship between the positioning of metal plate 9 and the heating time.

FIG. 5 teaches that when metal plate 9 is positioned in parallel with the bottom surface of wave guide 7, the heating time is shorter regarding both the milk and shao-mai. There are unfavorable temperature differences, which is especially significant in shao-mai(unevenness of heating is significant in' terms of a horizontal plane). On the other hand, when metal plate is positioned in the perpendicular orientation the temperature difference is small although a longer heating time is needed. It is understood from the above results that the microwaves are concentrated toward the center when metal plate 9 is positioned in parallel with the bottom surface of wave guide 7, while the microwaves are widely scattered when metal plate 9 is positioned perpendicular.

Because one heating pattern may be selected from two patterns according to the category specified by selection of a menu key 12 and to the large or small of quantity value of heating object 1 obtained from weight sensor 3, cooking is conducted at a high efficiency with a suppressed unevenness of temperature.

Now, a third embodiment is described with reference to FIGS. 1 through 4(c). Those components having the same structure as the second embodiment are represented with the same symbols, and explanation thereof is omitted here.

The point of difference as compared with the second embodiment is that the third embodiment comprises a motor 11 for revolving the metal plate 9 disposed within wave guide 7 and positioning of the metal plate 9 within the wave guide 7 is adjustable to any angle from parallel to the bottom surface of wave guide 7 to perpendicular to the bottom of heating cavity 2, according to detection results obtained from weight sensor 3 for detecting weight of heating object 1 or by the selection of cooking menu key 12.

The operation and the function are described in the following. After a menu key 12 suitable to a particular foodstuff is selected, a cooking start key 13 is pressed. Magnetron 6 starts irradiating microwaves. Metal turntable 4 as well as tray 5 are revolved by the motor of weight sensor 3, and heating object 1 revolves and the weight is measured. Based on the category of heating object specified by selection of a menu key 12 and the quantity value obtained from weight sensor 3, the metal plate 9, disposed within wave guide 7 for regulating the direction of microwave irradiation, is revolved by motor 11. In FIGS. 4(a), (b) and (c) illustrate distribution patterns of electric fields at the opening 8 corresponding to respective positioning angles of metal plate 9. FIG. 4(a) shows a distribution pattern when metal plate 9 is positioned in parallel with the inclined bottom surface of wave guide 7, whereas FIG. 4(c) shows the metal plate 9 when it is perpendicular to the bottom of heating cavity 2. FIG. 4(b) represents a state in between. In the state of FIG. 4(a), most of the microwaves irradiate directly on heating object 1 through an opening 8a formed by the bottom surface of wave guide 7 and metal plate 9. While in the state of FIG. 4(c), the microwaves are split into those from opening 8a formed by the bottom surface of wave guide 7 and those from opening 8b formed by the ceiling surface of wave guide 7 and metal plate 9. Heating object 1 absorbs microwaves directly reaching from the opening 8a and reflective waves reaching from opening 8b. The angle of metal plate 9 is variable to any angle between a state where it is parallel to the inclined bottom surface of wave guide 7 and a state where it is perpendicular to the bottom of heating cavity 2. Therefore the ratio of microwaves between those from opening 8a formed by the bottom surface of wave guide 7 and metal plate 9 and those from opening 8b formed by the ceiling surface of wave guide 7 and metal plate 9 is adjustable. This enables even heating that is suitable to a foodstuff to be conducted to that object 1.

A fourth embodiment is described hereunder with reference to FIGS. 2 through 4(c) and FIG. 6. Those components having the same structure as the third embodiment are represented with the same symbols, and explanation thereof is omitted. The special characteristic of with the fourth embodiment is that it comprises a stirrer 16 on one of the inner wall surfaces of heating cavity 2 other than that having opening 8.

Figure 6:
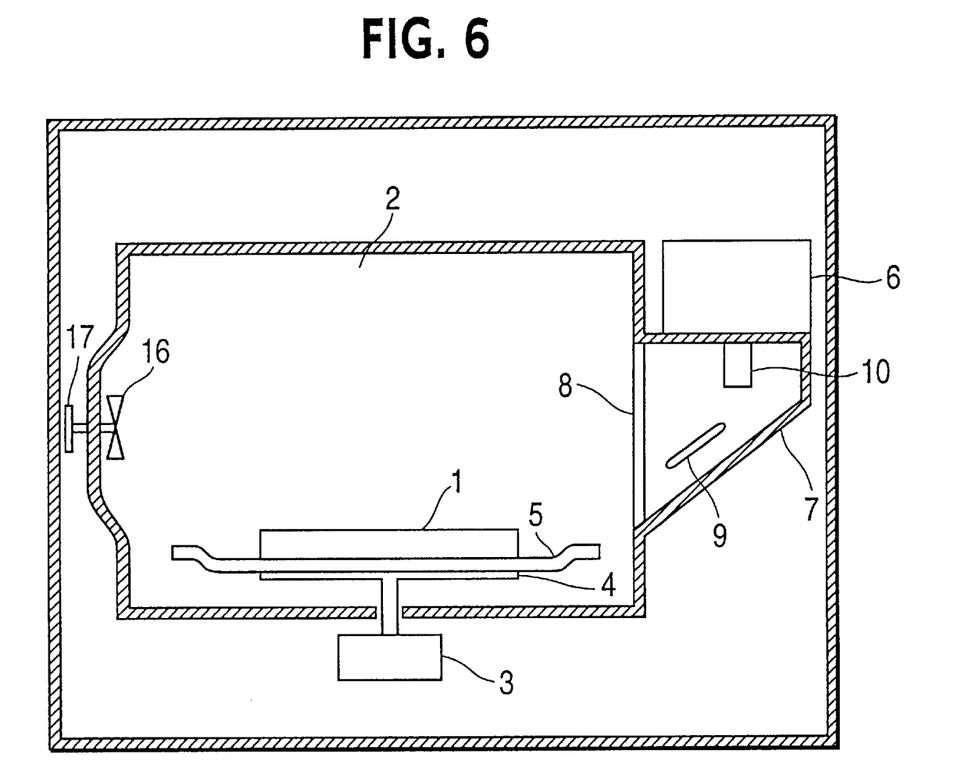
FIG. 6 is a cross-sectional front view of a microwave heating apparatus according to another embodiment of the present invention.

The operation and the function of the fourth embodiment are described in the following. After a menu key 12 suitable to a particular foodstuff is selected, a cooking start key 13 is pressed. Magnetron 6 starts irradiating microwaves. Metal turntable 4, as well as tray 5, are revolved by the motor of weight sensor 3, and heating object 1 revolves and the weight is measured. Based on the category of heating object 1 specified by selection of a menu key 12 and the quantity value obtained by weight sensor 3, the metal plate 9, disposed within wave guide 7, is revolved by motor 11. The stirrer 16 provided on an inner wall surface of heating cavity 2 is driven by a stirrer motor 17 in order to stir the microwaves. The effectiveness of microwave stirring for thawing is already known. In the present embodiment, the stirring effect is expected on the reflected microwaves irradiated from opening 8b, among those microwaves split for irradiation from opening 8a. formed by the bottom surface of wave guide 7 and metal plate 9 and those from opening 8b formed by the ceiling surface of wave guide 7 and metal plate 9.

A fifth embodiment is described hereunder with reference to FIG. 1, FIG. 2, FIG. 3 and FIG. 7. Those components having the same structure as the fourth embodiment are represented with the same symbols, and explanation thereof is omitted here.

Figure 7:
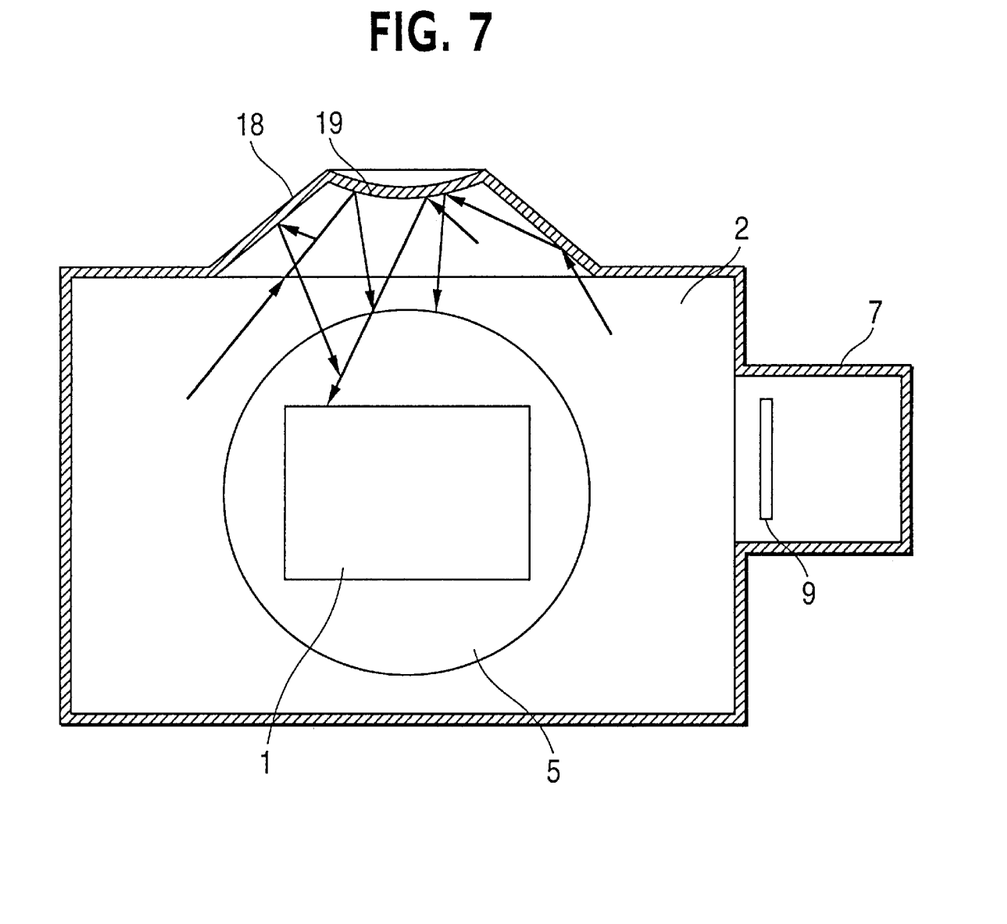
FIG. 7 is a cross-sectional top view of a microwave heating apparatus according to another embodiment of the present invention.

The special characteristic of the fifth embodiment is that a conically-shaped protrusion 18 extends towards the outside of the heating-cavity and has an inwardly protruding spherical protrusion 19. The protrusion 18 is provided on at least one of the inner wall surfaces of heating cavity other than that having the opening.

The operation and the function of the fifth embodiment are described in the following. After a menu key 12 suitable to a foodstuff is selected, a cooking start key 13 is pressed. Magnetron 6 starts irradiating microwaves. Metal turntable 4, as well as tray 5 are revolved by the motor of weight sensor 3, and heating object 1 revolves and the weight is measured. Based on a category of heating object 1 specified by selection of a menu key 12 and the quantity value obtained by weight sensor 3, the metal plate 9 disposed within wave guide 7 for regulating the direction of microwave irradiation is revolved by motor II. According to experimental results, the centrally-concentrated pattern of electric fields which is produced when metal plate 9 is positioned parallel to the bottom surface of wave guide 7 is suitable to warm up milk, boiled rice, etc., while the widely-dispersed pattern of electric fields which is produced when metal plate 9 is positioned perpendicular is suitable for thawing frozen foods, etc. When metal plate 9 is in the perpendicular positioning, the microwaves from opening 8a are absorbed directly into heating object 1, while those from opening 8b are absorbed into heating object 1 after being reflected by inner wall surfaces of heating cavity 2. Some of the microwaves hitting the conical outward protrusion are split into those immediately reflected and those concentrated to the center, depending on an angle of incidence. Those microwaves concentrated to the center are reflected by the inward spherical protrusion towards tray 5.

Figure 8:
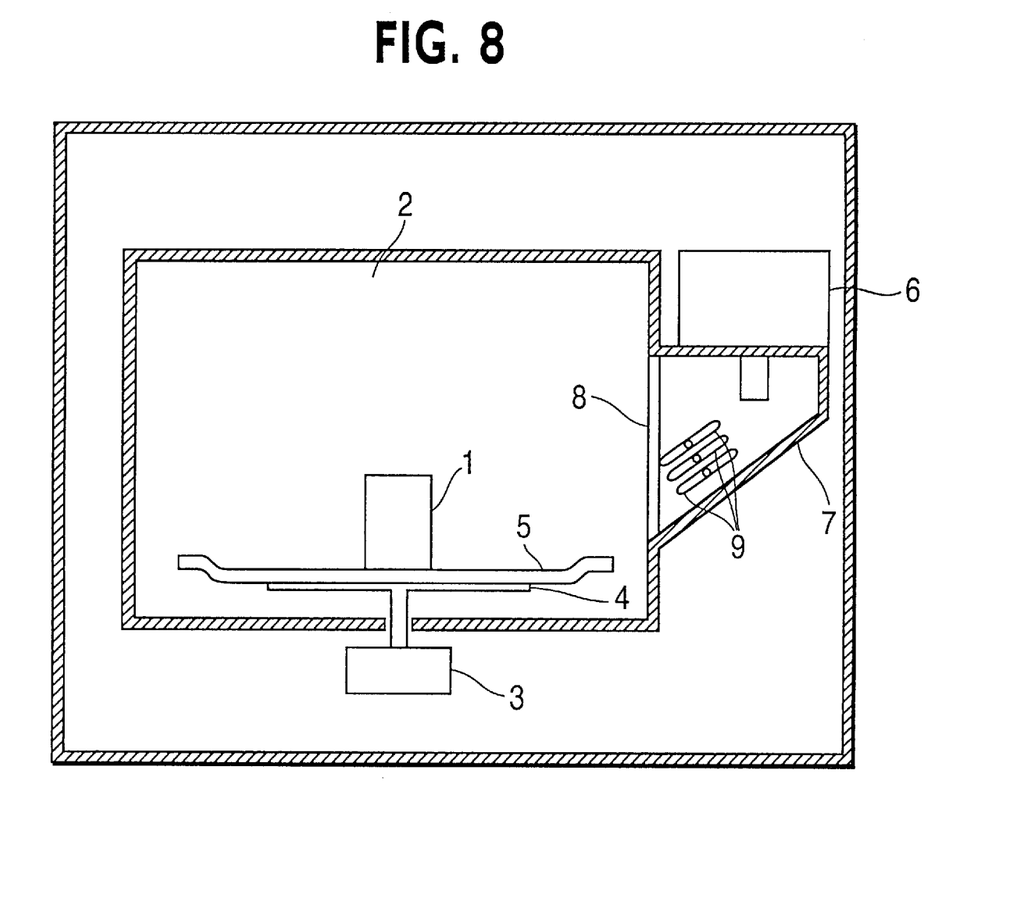
FIG. 8 is a cross-sectional front view of a microwave heating apparatus according to another embodiment of the present invention.

FIG. 8 is a cross-sectional front view of a microwave heating apparatus according to a sixth embodiment of the present invention.

The point of difference as compared with the first embodiment is that in the sixth embodiment there are a plurality of metal plates 9 for regulating the direction of microwave irradiation provided at an equal clearance in a vertical direction of the metal plate. The metal plates are revolvable at an equal clearance.

Those components having same structure as the first embodiment are represented with the same symbols, and explanation thereof is omitted here.

The operation and the function are described hereunder. In a case where there is one metal plate 9 for regulating the direction of microwave irradiation, like in the case of the first embodiment, some of the microaraves are directed towards something other than heating object 1 depending on the angle of metal plate 9. By providing a plurality of metal plates 9, the present embodiment makes all the microwaves from magnetron 6 travel towards the heating object 1, so as to further improve heating efficiency. Thus, the plural metal plates disposed with an equal clearances are effective in turning the microwaves into plane waves for a narrow directivity, and as a result the gain is increased.

In the microwave heating apparatus according to the present invention, a magnetron is mounted on the top surface of the wave guide, the bottom surface of the wave guide is inclined towards the bottom of the opening, and a metal plate is disposed in parallel with the bottom surface of wave guide. By so doing, the microwaves are guided to the opening with a minimum so as loss to irradiate approximately the center of a heating object with high efficiency, and thus the heating time can be shortened.

Because the angle of the metal plate inside the wave guide with respect to the bottom surface of wave guide is variable according to detection results obtained from a weight sensor for detecting weight of a heating object or by the selection of a menu key, the ratio of microwaves to be irradiated from an opening formed by the bottom surface of the wave guide and the metal plate versus those to be irradiated from an opening formed by the ceiling surface of the wave guide and the metal plate is variable. Therefore, the cooking capability may be improved by optimizing the angle of the metal plate so as to be most suitable for a foodstuff, or a heating object, according to the identification of heating object by selection of a cooking menu and the value of quantity obtained from theveight sensor.

A stirrer for stirring the microwaves provided on an inner wall surface of heating cavity other than that having the opening contributes stirring reflected microwaves from split openings, formed by the bottom surface of the wave guide and the metal plate and that formed by the ceiling surface of the wave guide and the metal plate. Therefore, unevenness of heating is improved also during thawing of frozen foodstuff where the allowable temperature range is narrow.

Further, the outward conical protrusion having an inward spherical protrusion at the center is provided on an inner wall surface of the heating cavity. The protrusion collects the microwaves irradiated from the opening 8b to the center, and the spherical protrusion at the center reflects them with a dispersion for irradiating the heating object 1. Therefore, the unevenness of heating is improved also during thawing of frozen foodstuff where the allowable temperature range is narrow.

What is claimed is:

1. A microwave heating apparatus comprising:

a heating cavity for housing an object to be heated;

a tray provided inside of said heating cavity for supporting the object to be heated;

a magnetron for irradiating microwaves;

a wave guide for guiding the microwaves, irradiated by said magnetron, into said heating cavity, said wave guide having an opening communicating with said heating cavity for feeding the microwaves traveling through said wave guide into said heating cavity from a side thereof;

at least one metal plate rotatably disposed in said wave guide for influencing the direction of the microwaves depending upon the rotational position of said metal plate; and driving means for rotating said metal plate;

a sensor for detecting physical properties of the object to be heated, wherein the angle of said metal plate with respect to a bottom surface of said wave guide is variable according to detection results obtained from said sensor.

2. A microwave heating apparatus as claimed in claim 1, wherein said magnetron is mounted on a top surface of said wave guide and the bottom surface of said wave guide is inclined towards the bottom of said opening, the rotational axis of said metal plate being disposed in parallel to the bottom surface of said wave guide with a predetermined gap between said metal plate and said wave guide bottom surface.

3. A microwave heating apparatus as claimed in claim 2, wherein the position of said metal plate is switchable by rotating said metal plate from a first position in which said metal plate is arranged in parallel with the wave guide bottom surface to a second position in which said metal plate is perpendicular to a bottom surface of said heating cavity.

4. The microwave heating apparatus as claimed in claim 2, further comprising a stirrer provided on an inner wall surface of said heating cavity other than that having the opening of said wave guide for stirring the microwave.

5. The microwave heating apparatus as claimed in claim 2, further comprising an outwardly projecting conical protrusion having an inward spherical protrusion at the center of said conical protrusion, said conical protrusion being provided on at least one of the inner wall surfaces of said heating cavity other than that having the opening of said wave guide.

6. The microwave heating apparatus as claimed in claim 2, wherein said at least one metal plate comprises a plurality of metal plates stacked in a stacking direction extending perpendicular to the surfaces of said metal plates, and said metal plates are stacked such that an equal clearance is provided between adjacent ones of said metal plates.

7. A microwave heating apparatus as claimed in claim 1, wherein said metal plate can be rotated from a first position in which said metal plate is arranged in parallel with the wave guide bottom surface to a second position in which said metal plate is arranged perpendicularly relative to a bottom surface of said heating cavity.

8. The microwave heating apparatus as claimed in claim 7, further comprising a stirrer provided on an inner wall surface of said heating cavity other than that having the opening of said wave guide for stirring the microwave.

9. The microwave heating apparatus as claimed in claim 7, further comprising an outwardly projecting conical protrusion having an inward spherical protrusion at the center of said conical protrusion, said conical protrusion being provided on at least one of the inner wall surfaces of said heating cavity other than that having the opening of said wave guide.

10. The microwave heating apparatus recited in claim 7, wherein said at least one metal plate comprises a plurality of metal plates stacked in a stacking direction extending perpendicular to the surfaces of said metal plates, and said metal plates are stacked such that an equal clearance is provided between adjacent ones of said metal plates.

11. The microwave heating apparatus as claimed in claim 1, further comprising a stirrer provided on an inner wall surface of said heating cavity other than that having the opening of said wave guide for stirring the microwave.

12. The microwave heating apparatus as claimed in claim 11, further comprising an outwardly projecting conical protrusion having an inward spherical protrusion at the center of said conical protrusion, said conical protrusion being provided on at least one of the inner wall surfaces of said heating cavity other than that having the opening of said wave guide.

13. The microwave heating apparatus as claimed in claim 11, wherein said at least one metal plate comprises a plurality of metal plates stacked in a stacking direction extending perpendicular to the surfaces of said metal plates, and said metal plates are stacked such that an equal clearance is provided between adjacent ones of said metal plates.

14. The microwave heating apparatus as claimed in claim 1, further comprising an outwardly projecting conical protrusion having an inward spherical protrusion at the center of said conical protrusion, said conical protrusion being provided on at least one of the inner wall surfaces of said heating cavity other than that having the opening of said wave guide.

15. The microwave heating apparatus as claimed in claim 1, wherein said at least one metal plate comprises a plurality of metal plates stacked in a stacking direction extending perpendicular to the surfaces of said metal plates, and said metal plates are stacked such that an equal clearance is provided between adjacent ones of said metal plates.

16. A microwave heating apparatus comprising:
a heating cavity for housing an object to be heated;
a tray provided inside of said heating cavity for supporting the object to be heated;
a magnetron for irradiating microwaves;
a wave guide for guiding the microwaves, irradiated by said magnetron, into said heating cavity,
said wave guide having an opening communicating with said heating cavity for feeding the microwaves traveling through said wave guide into said heating cavity from a side thereof;
at least one metal plate rotatably disposed in said wave guide for influencing the direction of the microwaves depending upon the rotational position of said metal plate;
driving means for rotating said metal plate; and
a sensor for detecting physical properties of the object to be heated, wherein the angle of said metal plate with respect to a bottom surface of said wave guide is variable according to detection results obtained by pressing a selected one of a plurality of cooking menu selection keys.

17. A microwave heating apparatus as claimed in claim 16, wherein said magnetron is mounted on a top surface of said wave guide and the bottom surface of said wave guide is inclined towards the bottom of said opening, the rotational axis of said metal plate being disposed in parallel to the bottom surface of said wave guide with a predetermined gap between said metal plate and said wave guide bottom surface.

18. A microwave heating apparatus as claimed in claim 17, wherein the position of said metal plate is switchable by rotating said metal plate from a first position in which said metal plate is arranged in parallel with the wave guide bottom surface to a second position in which said metal plate is perpendicular to a bottom surface of said heating cavity.

19. The microwave heating apparatus as claimed in claim 17, further comprising an outwardly projecting conical protrusion having an inward spherical protrusion at the center of said conical protrusion, said conical protrusion being provided on at least one of the inner wall surfaces of said heating cavity other than that having the opening of said wave guide.

20. The microwave heating apparatus as claimed in claim 17, wherein said at least one metal plate comprises a plurality of metal plates stacked in a stacking direction extending perpendicular to the surfaces of said metal plates, and said metal plates are stacked such that an equal clearance is provided between adjacent ones of said metal plates.

* * * * *